W. K. Winant
Billiard Cushion,

Nº 21,159. Patented Aug. 10, 1858.

Witnesses:
Lemuel W. Serrell.
Thomas G. Harold.

Inventor:
W. K. Winant.

UNITED STATES PATENT OFFICE.

W. K. WINANT, OF BROOKLYN, NEW YORK.

BILLIARD-CUSHION.

Specification of Letters Patent No. 21,159, dated August 10, 1858.

*To all whom it may concern:*

Be it known that I, WILLIAM K. WINANT, of Brooklyn, in the county of Kings and State of New York, have invented, made, and applied to use certain new and useful Improvements in Cushions for Billiard-Tables; and I do hereby declare that the following is a full, clear, and exact description of the construction and operation of the same, reference being had to the annexed drawing, making part of this specification, wherein—

Figure 1:
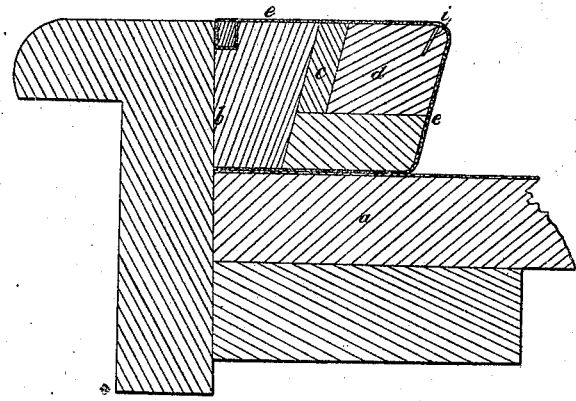
Figure 2:
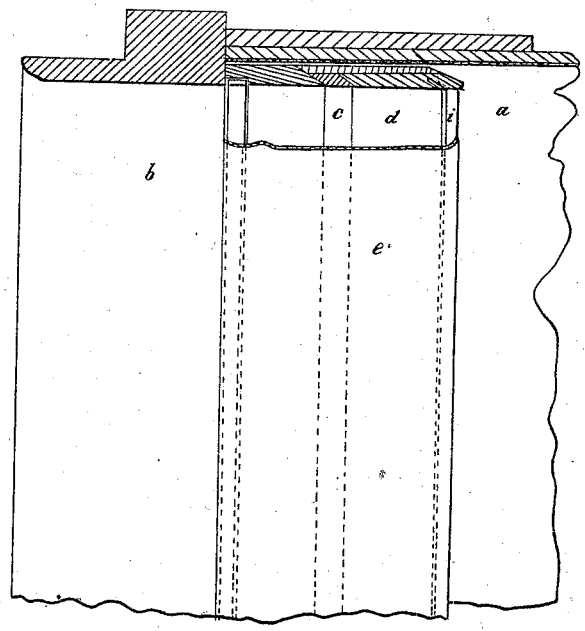

Figure 1, is a vertical cross section of said cushion, and Fig. 2, is a plan of a portion of a cushion with the cloth covering, partially removed.

Similar marks of reference denote the same parts.

Various characters of billiard cushions have heretofore been made with facings of different materials, several of which have been patented, my invention therefore does not apply to a facing to an elastic cushion, but my invention consists in the introduction of a strip of spring steel (or equivalent material) into a crease or groove cut in the upper face of the rubber near the angle thereof, in such a manner that said steel is protected from injury by the rubber which thus intervenes between the steel and the ball, and the cushion is rendered sufficiently firm to prevent the ball embedding and injuring the correctness of the angle of deflection: and beside this the strip is so narrow as not to be injured by the concussion and is retained in place without requiring any attachment by screws, cement or otherwise.

My invention also relates to a metallic bearing bar, against which the cushion sets, which by its rigidity and inertia causes the rubber cushion to be far more effective than if the rubber cushion set directly against the wooden cushion rail, and also lessens the sound from the concussion of the ball.

In the drawing $a$, is the bed of the table, and $b$, the cushion rail attached and fitted in any usual manner.

$c$, is a metallic bearing bar attached to the rail $b$, and intervening between that and the rubber cushion $d$, which cushion is attached in place by suitable cement or otherwise.

In the upper part of the cushion $d$, and near its edge, I make a long incision parallel to its edge, and at a slightly greater inclination than the face of the cushion, and into said crease or groove thus formed I introduce a narrow thin strip of steel $i$ or equivalent material, and the covering $e$, of cloth or other material as usual completes the cushion.

It will be apparent that said strip $i$, is retained in place by the rubber, and acts to prevent the ball embedding, and at the same time is itself protected from injury by the rubber on both sides,—so that the cushion is both "lively" accurate and durable.

I do not claim a steel facing to a billiard cushion, neither do I claim attaching said strip or facing to the rubber by causing said rubber while melted to flow against or around said strip of steel, neither do I claim india rubber or other facing between the steel and the ball, but

What I claim as my invention and desire to secure by Letters Patent is—

1. The strip $i$, of steel or equivalent material inserted into the crease or incision in the india rubber cushion substantially as and for the purposes specified.

2. I also claim the metallic bearing bar $c$, between the back of the india rubber and the cushion rail substantially as and for the purposes set forth.

In witness whereof I have hereunto set my signature this twelfth day of June 1858.

W. K. WINANT.

Witnesses:
LEMUEL W. SERRELL,
THOMAS G. HAROLD.